US011674720B2

(12) United States Patent
Nam et al.

(10) Patent No.: US 11,674,720 B2
(45) Date of Patent: Jun. 13, 2023

(54) DIFFUSION ABSORPTION REFRIGERATION APPARATUS AND REFRIGERATION METHOD

(71) Applicants: LG ELECTRONICS INC., Seoul (KR); KOREA UNIVERSITY RESEARCH AND BUSINESS FOUNDATION, Seoul (KR)

(72) Inventors: Hyeunsik Nam, Seoul (KR); Deokhyun Youn, Seoul (KR); Sungsub Lee, Seoul (KR); Jangseok Lee, Seoul (KR); Chungwoo Jung, Seoul (KR); Yongtae Kang, Seoul (KR); Hansol Jung, Seoul (KR)

(73) Assignees: LG ELECTRONICS INC., Seoul (KR); KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 403 days.

(21) Appl. No.: 16/961,637

(22) PCT Filed: Jan. 8, 2019

(86) PCT No.: PCT/KR2019/000279
§ 371 (c)(1),
(2) Date: Jul. 10, 2020

(87) PCT Pub. No.: WO2019/139333
PCT Pub. Date: Jul. 18, 2019

(65) Prior Publication Data
US 2020/0340715 A1    Oct. 29, 2020

(30) Foreign Application Priority Data

Jan. 12, 2018  (KR) .................. 10-2018-0004266

(51) Int. Cl.
*F25B 15/10*         (2006.01)
*C09K 5/04*          (2006.01)
(52) U.S. Cl.
CPC .............. *F25B 15/10* (2013.01); *C09K 5/047* (2013.01)
(58) Field of Classification Search
CPC .... F25B 15/10; F25B 2400/121; C09K 5/047; C09K 5/045; Y02B 30/62
See application file for complete search history.

(56) References Cited

U.S. PATENT DOCUMENTS 3,874,193 A    4/1975  Reistad
5,377,494 A    1/1995  Takagi et al.
(Continued)

FOREIGN PATENT DOCUMENTS

CN    2208687 Y    9/1995
JP    57132544 A   8/1982
(Continued)

*Primary Examiner* — Lionel Nouketcha
(74) *Attorney, Agent, or Firm* — Dentons US LLP (57) ABSTRACT

A diffusion absorption refrigeration apparatus includes a bubble pump; a gas-liquid separator; a condenser; a gas branch pipe; an evaporator; an absorber; a gas heat exchanger; a storage tank; and a solution heat exchanger, in which a single material of trans-1,3,3,3-tetrafluoropropene (R-1234ze(E)) and 2,3,3,3-tetrafluoropropene (R-1234yf), which have a low global warming potential (GWP), or a mixture thereof at a predetermined ratio is used as a refrigerant. Accordingly, the stability is high and a low GWP can be achieved.

19 Claims, 7 Drawing Sheets

(56) References Cited

U.S. PATENT DOCUMENTS

| | | | |
|---|---|---|---|
| 5,865,039 | A | 2/1999 | Muller et al. |
| 6,397,625 | B1 | 6/2002 | Kunze |
| 9,763,358 | B2 | 9/2017 | Habert et al. |
| 2009/0199709 | A1* | 8/2009 | Rojey ............... B01D 53/1462 203/38 |
| 2011/0219811 | A1 | 9/2011 | Kontomaris |
| 2012/0305480 | A1 | 12/2012 | Low |
| 2016/0157382 | A1 | 6/2016 | Habert et al. |

FOREIGN PATENT DOCUMENTS

| | | | |
|---|---|---|---|
| JP | 5861173 A | 4/1983 | |
| KR | 10-2006-0036580 A | 5/2006 | |
| KR | 10-2012-0110560 A | 10/2012 | |

\* cited by examiner

| PRESSURE (bar) ↓ \ CONCENTRATION(wt%) → | 25 | 30 | 35 | 40 | 50 | 55 | 60 | 65 |
|---|---|---|---|---|---|---|---|---|
| 2.0 |  | X | X | 13.8 | X | X | X | X |
| 3.0 | 10.9 | 6.4 | 3.8 | 4.5 | - | 14.8 | 15.2 | 16.7 |
| 3.5 | X | -15.1 | - | - | - | 10.6 | 12.9 | 14.7 |
| 4.0 | X | X | -154.6 | -11.4 | -1.5 | 8.9 | 11.4 | 11.9 |
| 4.5 | X | X | -12.2 | - | - | 7.2 | 10.2 | 10.9 |
| 5.0 | X | X | -1.1 | -11.3 | -3.8 | 7.1 | 8.9 | 9.1 |
| 5.5 | X | X | -4.2 | -5.6 | -3.4 | 5.7 | 8.1 | X |
| .0 | X | X | X | X | -3.1 | 4.3 | 7.9 | X |
| 7.0 | X | X | X | X | X | 6.7 | X | X |
| 8.0 | X | X | X | X | X | 8.9 | X | X |

[Fig. 6]

|  | 25 | 30 | 35 | 40 | 50 | 55 | 60 | 65 |
|---|---|---|---|---|---|---|---|---|
| 2.0 |  | X | X | 13.8 | X | X | X | X |
| 3.0 | 10.9 | 6.4 | 3.8 | 4.5 | - | 14.8 | 15.2 | 16.7 |
| 3.5 | X | -15.1 | - | - | - | 10.6 | 12.9 | 14.7 |
| 4.0 | X | X | -15.6 | -11.4 | -1.5 | 8.9 | 11.4 | 11.9 |
| 4.5 | X | X | -12.2 | - | - | 7.2 | 10.2 | 10.9 |
| 5.0 | X | X | -1.1 | -11.3 | -3.8 | 7.1 | 8.9 | 9.1 |
| 5.5 | X | X | -4.2 | -5.6 | -3.4 | 5.7 | 8.1 | X |
| 6.0 | X | X | X | X | -3.1 | 4.3 | 7.9 | X |
| 7.0 | X | X | X | X | X | 6.7 | X | X |
| 8.0 | X | X | X | X | X | 8.9 | X | X |

[Fig. 7]

CONCENTRATION(wt%) →

| PRESSURE (bar) ↓ | 25 | 30 | 35 | 40 | 50 | 55 | 60 | 65 |
|---|---|---|---|---|---|---|---|---|
| 2.0 |  | X | X | X | X | X | X | X |
| 3.0 | 20.3 | 20.1 | 3.8 | 27.5 | 18.4 | 21.7 | 23.4 | 28.1 |
| 3.5 | 13.4 | 19.6 | 18.7 | 13.2 | 14.1 | 17.9 | 20.1 | 21.8 |
| 4.0 | X | 14.2 | 11.9 | 11.9 | 7.1 | 15.9 | 16.4 | 18.2 |
| 4.5 | X | 10.4 | 5.1 | 5.5 | 1.3 | 14.1 | 13.1 | 14.5 |
| 5.0 | X | -2.8 | -2.3 | -2.6 | 3.7 | 10.4 | 9.9 | 10.2 |
| 5.5 | X | X | -3.8 | -1.9 | 0.3 | 11.3 | 9 | 9.6 |
| 6.0 | X | X | -2.2 | 0.1 | 0.7 | 11.9 | 8.7 | X |
| 7.0 | X | X | X | 2.1 | 5.2 | 14.3 | X | X |
| 8.0 | X | X | X | X | 6.4 | X | X | X |

[Fig. 8]

|  | 25 | 30 | 35 | 40 | 50 | 55 | 60 | 65 |
|---|---|---|---|---|---|---|---|---|
| 2.0 |  | X | X | X | X | X | X | X |
| 3.0 | 20.3 | 20.1 | 3.8 | 27.5 | 18.4 | 21.7 | 23.4 | 28.1 |
| 3.5 | 13.4 | 19.6 | 18.7 | 13.2 | 14.1 | 17.9 | 20.1 | 21.8 |
| 4.0 | X | 14.2 | 11.9 | 11.9 | 7.1 | 15.9 | 13.1 | 18.2 |
| 4.5 | X | 10.4 | 5.1 | 5.5 | 1.3 | 14.1 | 9.9 | 14.5 |
| 5.0 | X | -2.8 | -2.3 | -2.6 | 3.7 | 10.4 | 9 | 10.2 |
| 5.5 | X | X | -3.8 | -1.9 | 0.3 | 11.3 | 8.7 | 9.6 |
| 6.0 | X | X | -2.2 | 0.1 | 0.7 | 11.9 | 7.9 | X |
| 7.0 | X | X | X | 2.1 | 5.2 | 14.3 |  | X |
| 8.0 | X | X | X | X | 6.4 | X | X | X |

[Fig. 9]

| CHARG CONCENTRATION | 35 wt% | | 40 wt% | | 45 wt% | |
|---|---|---|---|---|---|---|
| CHARGE PRESSURE | Eva. [°C] | Gen. [°C] | Eva. [°C] | Gen. [°C] | Eva. [°C] | Gen. [°C] |
| 3 bar | 21.3 | 61.1 | X | X | 21.3 | 61.1 |
| 4 bar | 19.5 | 72.4 | 19.5 | 72.4 | 19.5 | 72.4 |
| 5 bar | 17.6 | 74.5 | 17.6 | 74.5 | 17.6 | 74.5 |
| 5.5 bar | 6.1 | 85.7 | 6.1 | 85.7 | 6.1 | 85.7 |
| 6 bar | 5.2 | 90.9 | 5.2 | 90.9 | 5.2 | 90.9 |
| 6.5 bar | 5.3 | 93.4 | 5.3 | 93.4 | 5.3 | 93.4 |
| 7 bar | 4.4 | 95.0 | 4.4 | 95.0 | X | X |
| 7.5 bar | 4.1 | 104.8 | 4.1 | 104.8 | X | X |
| 8 bar | X | X | 4.1 | 104.8 | X | X |

[Fig. 10]

| | ABSORPTION RATE(wt%) | |
|---|---|---|
| SOLVENT \ REFRIGERANT | 1-CHLORO-3, 3, 3-TRIFLUOROPROPENE | TRANS-1, 3, 3, 3-TETRAFLUOROPROPENE |
| DMAC | 7 | 55 |
| DMF | 7 | 50 |
| PROPYLENE GLYCOL | 3 | 10 |
| TRIETHYLENE GLYCOL | 3 | 8 |
| DIETHYLENE GLYCOL | 3 | 7 |

[Fig. 11]

DIFFUSION ABSORPTION REFRIGERATION APPARATUS AND REFRIGERATION METHOD

This application is a National Stage Application of International Application No. PCT/KR2019/000279, filed on Jan. 8, 2019, which claims priority to Korean Patent Application No. 10-2018-0004266, filed on Jan. 12, 2018, all of which are hereby incorporated by reference in their entirety for all purposes as if fully set forth herein.

TECHNICAL FIELD

The present disclosure relates to a diffusion absorption refrigeration apparatus and a refrigeration method.

The present disclosure relates to a diffusion absorption refrigeration apparatus and a refrigeration method which can use a refrigerant having a low global warming potential (GWP).

BACKGROUND

Because a diffusion absorption refrigeration (DAR) system uses a bubble pump rather than a compressor, the system does not have noise and vibration caused by mechanical driving of the compressor, and thus has been utilized in hotel rooms or offices that require particular quietness.

The diffusion absorption refrigeration system does not need a separate pressure control apparatus, and has high durability and reliability because the internal pressure is maintained constantly. Further, the diffusion absorption refrigeration system has advantages in that the system has lower maintenance costs and lower initial investment costs than those of other systems due to these characteristics. In addition, the diffusion absorption refrigeration system has a simple structure because an absorber and a condenser which employ a natural convection refrigeration method are used and a mechanical driving unit is not used.

The diffusion absorption refrigeration system is introduced in 'Numerical investigation of a diffusion absorption refrigeration cycle', volume 28, issue 4, June 2005, pages 515 to 525 of the International Journal of Refrigeration.

In the related art, the diffusion absorption refrigeration system has problems as follows.

First, since the natural convection refrigeration method is applied, the diffusion absorption refrigeration system has a problem in that there is a limitation in refrigeration capacity as compared to other refrigerators that employ a forced convection method.

For example, the existing ammonia (NH3) and water diffusion absorption refrigeration needs a separate pre-treatment apparatus because high generator temperature and pressure are required. Furthermore, although ammonia gas is environmentally friendly, ammonia gas is toxic and explosive, and thus is dangerous at the time of leakage, and for this reason, ammonia gas is regulated by high pressure gas safety management law, and accordingly, there is a problem in that it is difficult to apply ammonia gas for general household use.

As another example, using a water/lithium bromide system is highly corrosive and cannot obtain a low temperature of 0° C. or less, so that it is impossible to apply the water/lithium bromide system to a freezing/cooling system. Further, since the water/lithium bromide system is driven in a vacuum state, it is difficult to maintain the system in the case of breakage of the apparatus, and thus it is difficult to apply the water/lithium bromide system for general household use.

SUMMARY

The present disclosure proposes a refrigerant as a medium to be used for a cycle of a diffusion absorption refrigeration apparatus which enhances the safety and the like of the diffusion absorption refrigeration apparatus, and which can also be used for household use.

The present disclosure proposes a refrigerant as a medium to be used for a cycle of a diffusion absorption refrigeration apparatus capable of achieving a low GWP.

The present disclosure proposes a combination of a refrigerant, an absorbent, and an auxiliary gas, which improves the low freezing performance coefficient of a diffusion absorption refrigeration apparatus and can be used for commercial purposes.

Technical Solution

The diffusion absorption refrigeration apparatus has high stability and may achieve a low global warming potential (GWP) by using a single material of trans-1,3,3,3-tetrafluoropropene (R-1234ze(E)) and 2,3,3,3-tetrafluoropropene (R-1234yf), which have a low global warming potential (GWP), or a mixture thereof at a predetermined ratio as a refrigerant. The diffusion absorption refrigeration apparatus includes a bubble pump; a gas-liquid separator; a condenser; a gas branch pipe; an evaporator; an absorber; a gas heat exchanger; a storage tank; and a solution heat exchanger.

In order to obtain a sufficient freezing performance coefficient, as the absorbent, a single material of an alkylacetamide and a formamide, or a mixture thereof at a predetermined ratio is used, and preferably, a linear alkylacetamide is used as the alkylacetamide, and preferably, the alkylacetamide is used as the DMAC and the formamide is used as the DMF. Further, as the auxiliary gas, a single material of an inert gas including helium and argon, or a mixture thereof at a predetermined ratio is used.

In order to operate a diffusion absorption refrigeration apparatus under various conditions which have different background temperatures, a weight ratio of the refrigerant-absorbent, which exhibits a ratio of the refrigerant and the absorbent, may be 30 wt % to 60 wt %, a charge pressure of the auxiliary gas may be 2.0 bar to 8.0 bar, preferably, the weight ratio of the refrigerant-absorbent may be 30 wt % to 55 wt %, the charge pressure of the auxiliary gas may be 3.0 bar to 7.0 bar, and preferably, the weight ratio of the refrigerant-absorbent may be 35 wt % to 50 wt %, and the charge pressure of the auxiliary gas may be provided at 3.5 bar to 6.0 bar.

In order to secure stability, GWP, and freezing performance, when the 2,3,3,3-tetrafluoropropene is used alone, the weight ratio of the refrigerant-absorbent, which exhibits a ratio of the refrigerant and the absorbent, may be 35 wt % to 45 wt %, and the charge pressure of the auxiliary gas may be provided at 5.0 bar to 8.0 bar.

In order to obtain high stability and a low GWP, disclosed is a diffusion absorption refrigeration method including: condensing a refrigerant gas which is a single material of trans-1,3,3,3-tetrafluoropropene (R-1234ze(E)) and 2,3,3,3-tetrafluoropropene (R-1234yf), which have a GWP, or a mixture thereof at a predetermined ratio; transferring a liquid refrigerant discharged from the condenser to an inlet of an evaporator and transferring the refrigerant discharged from an absorber to the inlet of the evaporator, the refrigerant being mixed with an auxiliary gas; joining the liquid refrigerant and a mixture of the refrigerant and the auxiliary gas at the inlet of the evaporator; carrying out cooling while the joined mixture is passing through the evaporator; joining the mixture of the liquid refrigerant and the auxiliary gas passing through a gas heat exchanger and exchanging heat with the uncondensed refrigerant gas and transferring the joined mixture to a solution tank; transferring a strong solution from the solution tank to a bubble pump; and dividing the strong solution into refrigerant bubbles comprising the refrigerant gas and a weak solution in which the refrigerant at low concentration is dissolved in an absorbent and guiding the refrigerant gas to the condenser.

The diffusion absorption refrigeration system of the present disclosure includes: a bubble pump for together pushing up a weak solution in which a refrigerant at low concentration is dissolved in an absorbent using the refrigerant bubbles comprising a refrigerant gas in a gas state by applying heat; a gas-liquid separator for separating a liquid from the refrigerant gas; a condenser for condensing the refrigerant gas; a gas branch pipe for branching off the uncondensed refrigerant gas after passing through the condenser; an evaporator for evaporating the liquid refrigerant condensed through the condenser; an absorber for regenerating the weak solution into a strong solution using the refrigerant evaporated from the evaporator; a gas heat exchanger for heat-exchanging the refrigerant evaporated from the evaporator and a refrigerant-auxiliary gas mixture having passed through the absorber; and a storage tank in which the liquid refrigerant and the auxiliary gas are stored and for supplying the liquid refrigerant to the bubble pump, in which the refrigerant is a single material of trans-1,3,3,3-tetrafluoropropene (R-1234ze(E)) and 2,3,3,3-tetrafluoropropene (R-1234yf), which have a low GWP, or a mixture thereof at a predetermined ratio, the absorbent is a single material of an alkylacetamide and a formamide, or a mixture thereof at a predetermined ratio, and the auxiliary gas is provided as a single material of an inert gas comprising helium and argon, or a mixture thereof at a predetermined ratio. Through the present system, an effect of global warming may be reduced, high stability may be obtained, and sufficient freezing performance may be obtained.

Advantageous Effects

According to the present disclosure, a diffusion absorption refrigeration apparatus using a safe refrigerant is proposed and can be applied for general household use.

According to the present disclosure, the regulation can be satisfied by proposing a diffusion absorption refrigeration apparatus using a refrigerant having a low GWP.

According to the present disclosure, the diffusion absorption refrigeration apparatus can be applied to the actual industry by proposing a combination and a ratio of a refrigerant, an absorbent, and an auxiliary gas, which can also be applied at a level of actually various refrigeration apparatuses, particularly, refrigeration apparatuses for general household use differentiated from for industrial use.

DESCRIPTION OF DRAWINGS

FIGS. 5 and 6 are tables which summarize the temperature of an evaporator by setting the atmospheric temperature at 18° C. and varying the pressure (vertical axis) of the auxiliary gas and the weight ratio (horizontal axis) of the refrigerant-absorbent based on an assumption that the atmosphere is winter, where FIG. 5 is a view illustrating measured values, and FIG. 6 is a view illustrating a region in which the temperature of the measured value is exhibited as a color and preferably suggested.

FIGS. 7 and 8 are tables which summarize the temperature of an evaporator by setting the atmospheric temperature at 28° C. and varying the pressure (vertical axis) of the auxiliary gas and the weight ratio (horizontal axis) of the refrigerant-absorbent based on an assumption that the atmosphere is summer, where FIG. 7 is a view illustrating measured values, and FIG. 8 is a view illustrating a region in which the temperature of the measured value is exhibited as a color and preferably suggested.

DETAILED DESCRIPTION

Hereinafter, specific embodiments of the present invention will be described in detail with reference to the accompanying drawings. A person of ordinary skill in the art, understanding the spirit of the present invention can easily propose other embodiments included in the scope of the same spirit by the addition, change, deletion, and the like of constituent elements, and thus they also fall within the scope of the present invention.

Figure 1:
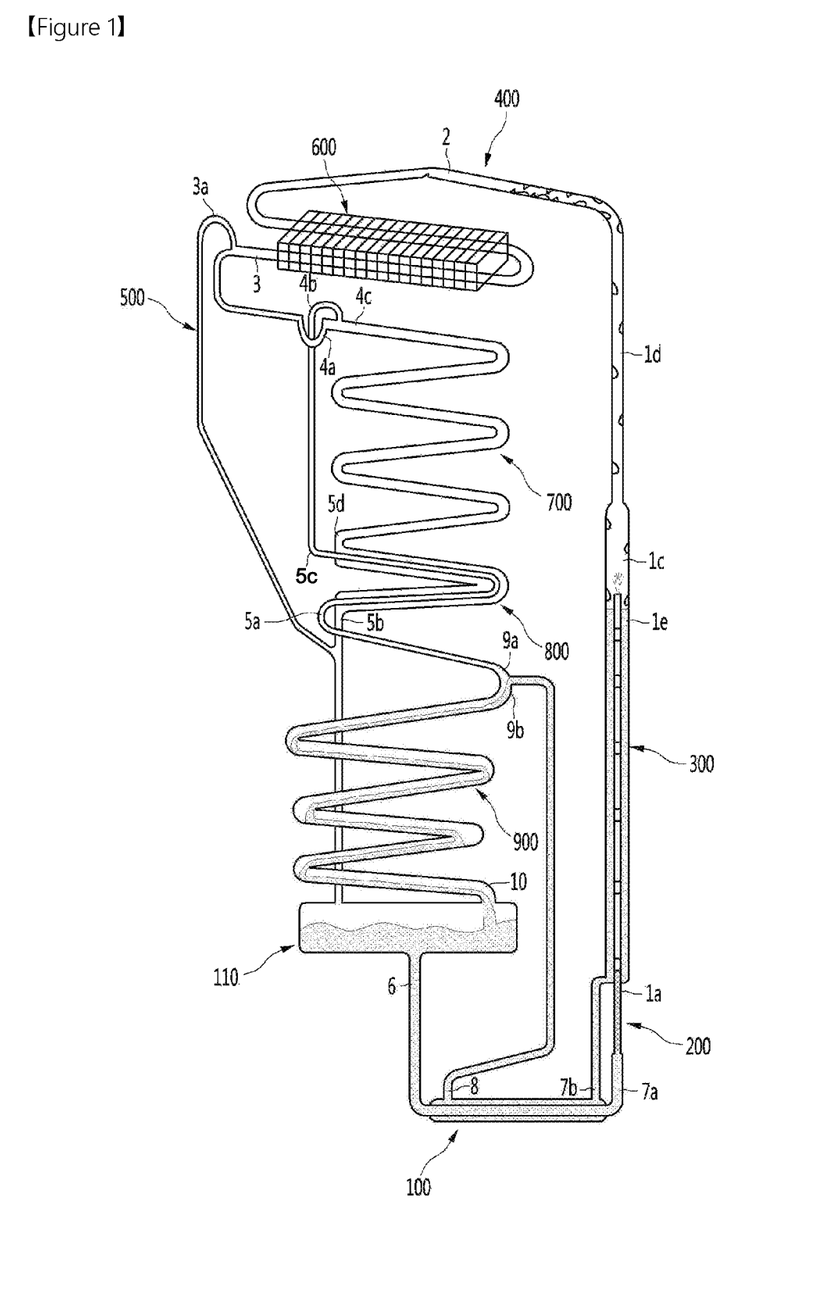
FIG. 1 is a configuration view of a diffusion absorption refrigeration apparatus according to embodiments of the present invention.
Figure 2:
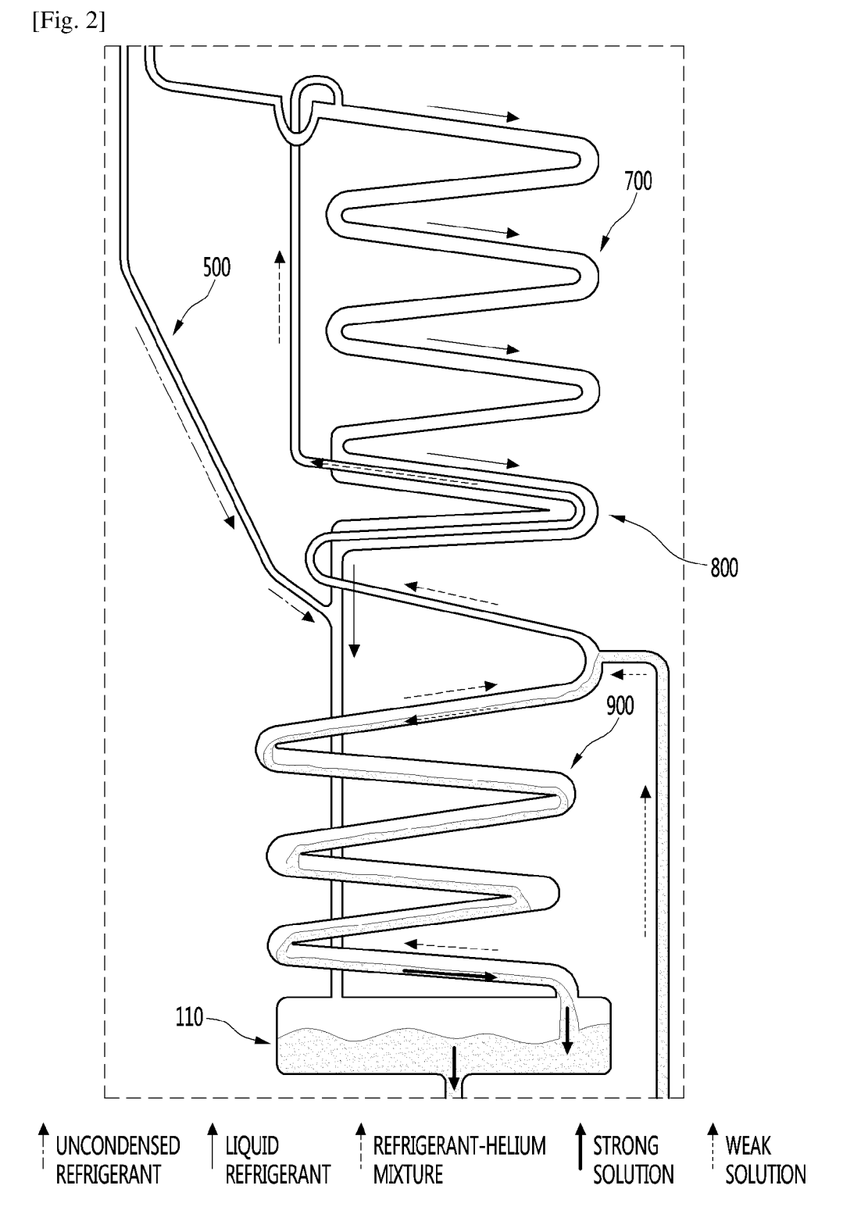
FIG. 2 is a view illustrating each operating medium in detail.

FIG. 1 is a configuration view of a diffusion absorption refrigeration apparatus according to embodiments of the present invention, and FIG. 2 is a view more specifically illustrating each operating medium.

Referring to FIGS. 1 and 2, the diffusion absorption refrigeration apparatus according to the embodiments include: a generator 200 for generating refrigerant bubbles including a refrigerant gas; a bubble pump 300 for pushing up a weak solution by using the refrigerant bubbles; a gas-liquid separator 400 for separating a liquid from the refrigerant gas; a condenser 600 for condensing the refrigerant gas; a gas branch pipe 500 for branching off the uncondensed refrigerant gas after passing through the condenser; an evaporator 700 for evaporating the liquid refrigerant condensed through the condenser; a gas heat exchanger 800 for heat-exchanging the evaporated refrigerant with a refrigerant-auxiliary gas mixture having passed through an absorber 900; the absorber 900 for regenerating a weak solution and a storage tank 110 in which the liquid refrigerant and the auxiliary gas are stored, and a solution heat-exchanger 100 for heat-exchanging a weak solution at high temperature and a strong solution at low temperature.

The total amount of absorbent and refrigerant housed inside the diffusion absorption refrigeration apparatus according to the embodiments may be determined in advance according to the shape and scale of the freezing cycle.

For example, in a steady state of the refrigeration apparatus, the weak solution is discharged from the upper end of the bubble pump 300, and then an amount sufficient to flow the weak solution to the upper end of the absorber 900 due to the difference in potential head should be secured.

In general, in a diffusion absorption refrigeration apparatus, according to the size and form of the refrigeration apparatus, a mixture of the absorbent and the refrigerant is introduced in a predetermined amount sufficient to secure the potential head into the diffusion absorption refrigeration apparatus. Thereafter, the diffusion absorption refrigeration apparatus will be operated by a method of filling an auxiliary gas and setting the internal pressure. Accordingly, the amount of the refrigerant-absorbent is determined in advance, and the ratio of the refrigerant-absorbent and the charge pressure of the auxiliary gas may be design factors.

Hereinafter, the circulation process of the state of a medium, that is, a refrigerant, an absorbent, and an auxiliary gas in the diffusion absorption refrigeration apparatus according to the embodiments will be sequentially described. Meanwhile, the operation of the refrigeration apparatus can be more clearly understood by examining the state of each medium together.

The meaning of each arrow in FIG. 2 will now be described.

An uncondensed refrigerant is a refrigerant which is not condensed in a condenser, and means a medium which is bypassed without entering an evaporator.

A liquid refrigerant means a refrigerant in a liquid state, which flows into an evaporator.

A refrigerant-auxiliary mixture means the circulation process of a refrigerant, and here, helium may be exemplified as an auxiliary gas.

A strong solution means a solution in which a large amount of refrigerant is included in a mixture of a refrigerant/absorbent.

A weak solution means a solution in which a small amount of refrigerant is included in a mixture of a refrigerant/absorbent.

The moving process of each medium is more clearly understood by imparting a number/alphabet to each point in FIG. 1.

The strong solution is transferred from a solution heat exchanger 100 communicating with a bottom of the storage tank 110 to a generator 200 (pathway from 6 to 7a). Refrigerant bubbles are produced by heat applied to the generator 200, and as a result, the transferred strong solution rises up (pathway from 1a to 1c). A refrigerant gas is included inside the refrigerant bubbles, and in this case, as the refrigerant is vaporized, the strong solution is changed into the weak solution. As the refrigerant bubbles are allowed to rise up by buoyancy force, the weak solution is together pushed up and discharged from the end of the bubble pump 300 (point at 1c). The bubble pump becomes a driving force for the movement of all the media of the diffusion absorption refrigeration apparatus according to the embodiments.

When the weak solution and the refrigerant bubbles are discharged from the end of the bubble pump 300, more specifically, the end of an internal tube, the weak solution flows into an external tube by gravitational force (point at 1e), and the refrigerant gas is transferred to the gas-liquid separator 400 (pathway from 1d to 2).

The weak solution flowing into the external tube of the bubble pump 300 is heat-exchanged with the strong solution at low temperature in the solution heat exchanger 100. The weak solution is heat-exchanged in a pathway from 7b to 8, and the strong solution is heat-exchanged in a pathway from 6 to 7a. The weak solution heat-exchanged with the strong solution is transferred to the upper end of the absorber 900 (pathway from 8 to 9b).

Meanwhile, in the gas-liquid separator 400, extra moisture is removed from the heated refrigerant gas (pathway from 1d to 2), and is condensed while passing through the condenser 600 (pathway from 2 to 3).

The refrigerant (point at 3) discharged from the condenser 600 is transferred to the evaporator 700, and the uncondensed refrigerant gas is transferred to the storage tank 110 through the gas branch pipe 500 (pathway from 3a to 6).

Meanwhile, the liquid refrigerant discharged from the condenser 600 is transferred to the inlet of the evaporator 700 (pathway from 4a to 4c), and the refrigerant-auxiliary mixture discharged from the absorber 900 is transferred to the inlet of the evaporator 700 (from 4b to 4c). At the inlet (point at 4c) of the evaporator 700, the liquid refrigerant and the refrigerant-auxiliary gas mixture are joined and flows into the evaporator.

Refrigeration is performed while the liquid refrigerant and the refrigerant-auxiliary gas mixture pass through the evaporator 700, so that it is possible to provide a cool air to a desired site. Thereafter, the mixture of the refrigerant and the auxiliary gas evaporated from the evaporator 700 can be heat-exchanged with the refrigerant-auxiliary mixture having passed through the absorber 900 from the gas heat exchanger 800 (the mixture of the refrigerant and the auxiliary gas evaporated follows the pathway from 5d to 5b, and the refrigerant-auxiliary gas mixture having passed through the absorber 900 follows the pathway from 5a to 5c).

The liquid refrigerant and auxiliary gas mixture (point at 5b) discharged from the gas heat exchanger 800 and the uncondensed refrigerant (point at 3a) discharged from the gas branch pipe 500 are joined with each other, and transferred to the storage tank 110.

Meanwhile, at the upper end of the absorber 900, the weak solution discharged from the solution heat exchanger 100 is supplied, and forms a counter flow with the refrigerant-auxiliary gas mixture (the weak solution follows the pathway from 9b to 10, and the refrigerant-auxiliary gas mixture follows the pathway from 10 to 9a). The medium flowing into the absorber 900 forms a flow in opposite direction, that is, a counter flow, thereby enhancing the absorption performance.

While the weak solution passes through the absorber 900, the delivery of the refrigerant occurs between the weak solution and the refrigerant-auxiliary gas mixture, so that the weak solution may be regenerated into the strong solution.

The diffusion absorption refrigeration apparatus according to the embodiments may use a single material of trans-1,3,3,3-tetrafluoropropene (R-1234ze(E)) and 2,3,3,3- tetrafluoropropene (R-1234yf), which have a low GWP, or a mixture thereof at a predetermined ratio, as the refrigerant.

The diffusion absorption refrigeration apparatus according to the embodiments may use a single material of an alkylacetamide and a formamide, or a mixture thereof at a suitable ratio, as the absorbent. The alkylacetamide may use a linear alkylacetamide, the linear alkylacetamide may use dimethylacetamide (DMAC), and the formamide may use dimethylformamide (DMF).

The diffusion absorption refrigeration apparatus according to the embodiments may use a single material of an inert gas exemplified by helium and argon or a mixture thereof at a suitable ratio, as the auxiliary gas.

Figure 3:
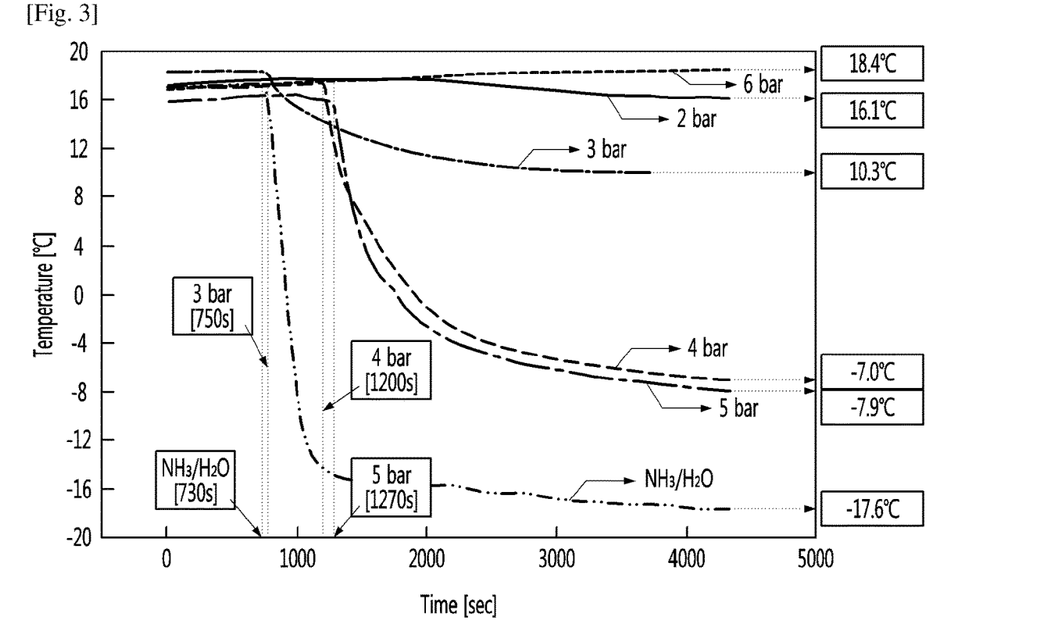
FIG. 3 is a graph illustrating the minimum temperature of an evaporator of an auxiliary gas of a diffusion absorption refrigeration apparatus which uses trans-1,3,3,3-tetrafluoropropene as a refrigerant, DMAC as an absorbent, and helium as an auxiliary gas at each pressure.

FIG. 3 is a graph illustrating the minimum temperature of an evaporator of an auxiliary gas of a diffusion absorption refrigeration apparatus which uses trans-1,3,3,3-tetrafluoropropene as a refrigerant, DMAC as an absorbent, and helium as an auxiliary gas at each pressure.

In this case, a weight ratio (a weight of a refrigerant/(a weight of a refrigerant+a weight of an absorbent) of the refrigerant-absorbent is 40 wt %.

Figure 4:
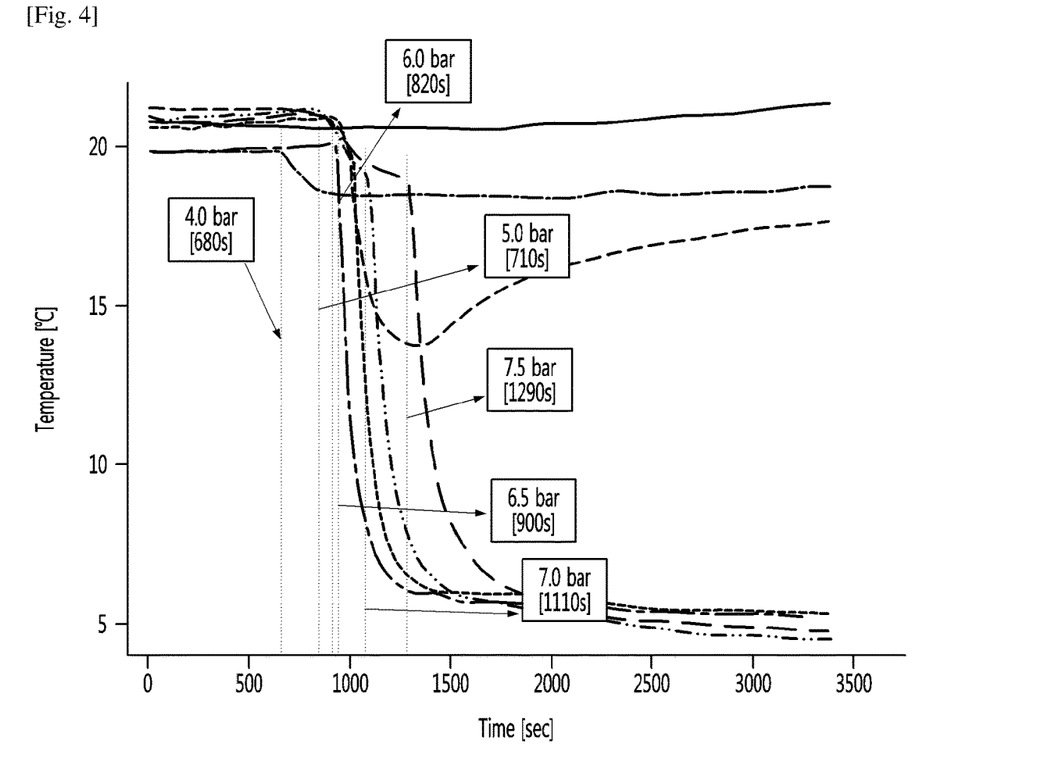
FIG. 4 is a graph illustrating the minimum temperature of an evaporator of an auxiliary gas of a diffusion absorption refrigeration apparatus which uses 2,3,3,3-tetrafluoropropene as a refrigerant, DMAC as an absorbent, and helium as an auxiliary gas at each pressure.

FIG. 4 is a graph illustrating the minimum temperature of an evaporator of an auxiliary gas of a diffusion absorption refrigeration apparatus which uses 2,3,3,3-tetrafluoropropene as a refrigerant, DMAC as an absorbent, and helium as an auxiliary gas at each pressure.

In this case, a weight ratio (a weight of a refrigerant/(a weight of a refrigerant+a weight of an absorbent) of the refrigerant-absorbent is 35 wt %.

As already described, in the diffusion absorption refrigeration apparatus, the charge pressure of the auxiliary gas may be a design factor.

Referring to FIGS. 3 and 4, when the charge pressure of the auxiliary gas is 2 bar or less, which is a low value, the equilibrium temperature of the refrigerant gas generated from the generator 210 is low, and the condensation temperature in the condenser is low due to the reduction in condensed pressure. Accordingly, when the condensation temperature is low under a condition in which the outside air temperature is constant, the difference in temperature with the outside air is decreased, so that the condensation capacity deteriorates in the condenser, and since the circulation of the refrigerant is not smooth for this reason, it can be confirmed that the system is not normally operated.

When the charge pressure of the auxiliary gas is 8 bar or more, which is an excessively high value, a phenomenon contrary to that described above occurs, so that it can be confirmed that the system is not normally operated.

As already described, in the diffusion absorption refrigeration apparatus, the ratio of the refrigerant-absorbent may be a design factor.

The ratio of the refrigerant-absorbent affects the amount of refrigerant bubbles generated, the difference in concentration between the strong solution and the weak solution, and the temperature of the absorber in the same heater capacity, and thus becomes a major variable of the diffusion absorption refrigeration apparatus.

For example, when the ratio of the refrigerant-absorbent (also referred to as a charge concentration) is low, in the case where the same heat amount is given, the amount of refrigerant required to drive the cycle of the diffusion absorption refrigeration apparatus is not sufficient. Specifically, the concentration gradient of the strong solution and the weak solution required to drive the cycle is not sufficient, so that a fundamental cycle may not be driven.

The inventor carried out a plurality of experiments, while varying the pressure of an auxiliary gas and a weight ratio (a weight of a refrigerant/(a weight of a refrigerant+a weight of an absorbent) of the refrigerant-absorbent in a diffusion absorption refrigeration apparatus which uses the 2,3,3,3-tetrafluoropropene, DMAC as the absorbent, and helium as the auxiliary gas, under the background. The results are described by using FIGS. 5 to 8.

Figure 5:
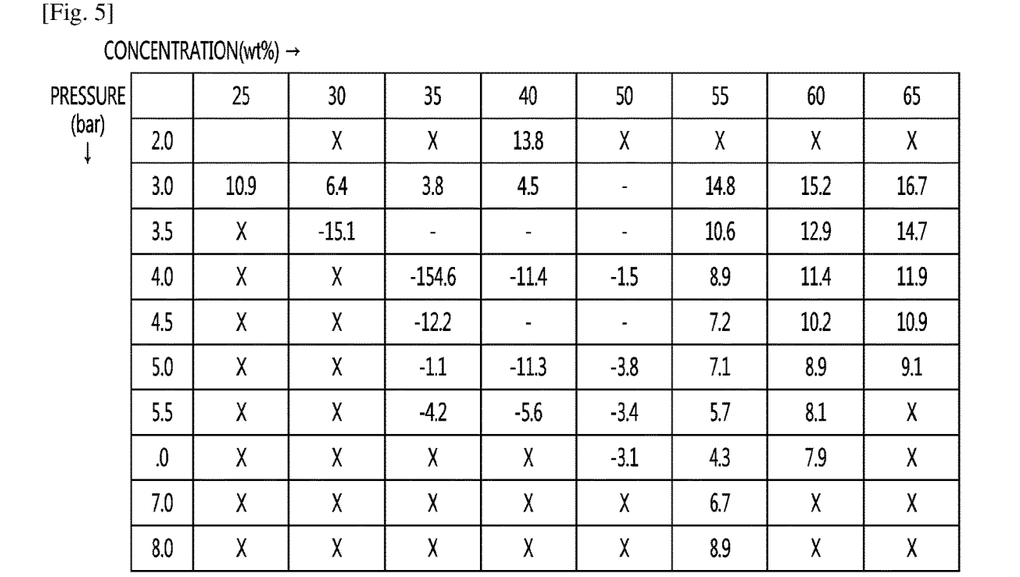
Figure 6:
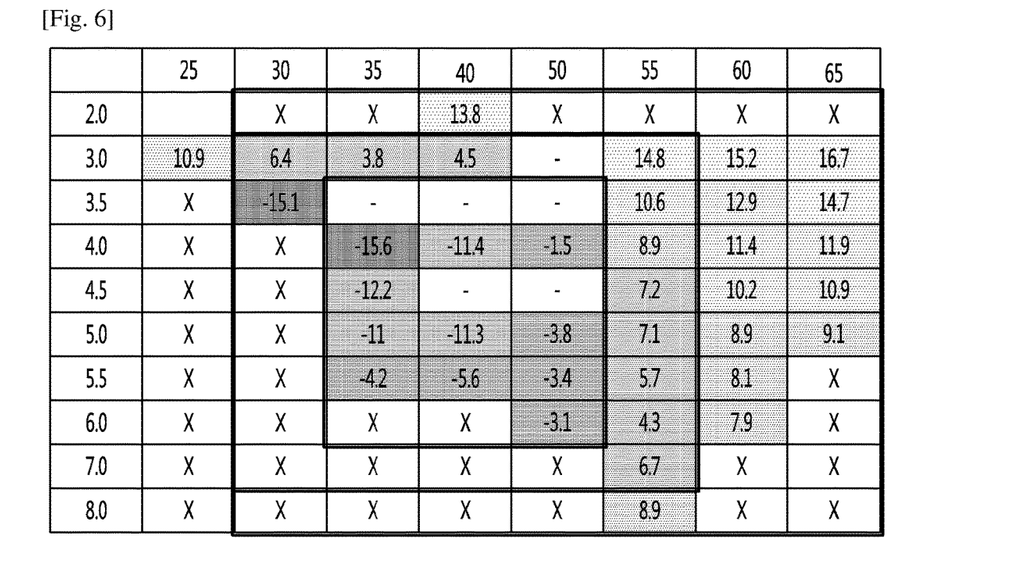

FIGS. 5 and 6 are tables which summarize the temperature of an evaporator by setting the atmospheric temperature at 18° C. and varying the pressure (vertical axis) of the auxiliary gas and the weight ratio (horizontal axis) of the refrigerant-absorbent based on an assumption that the atmosphere is winter, where FIG. 5 is a view illustrating measured values, and FIG. 6 is a view illustrating a region in which the temperature of the measured value is exhibited as a color and preferably suggested.

Figure 7:
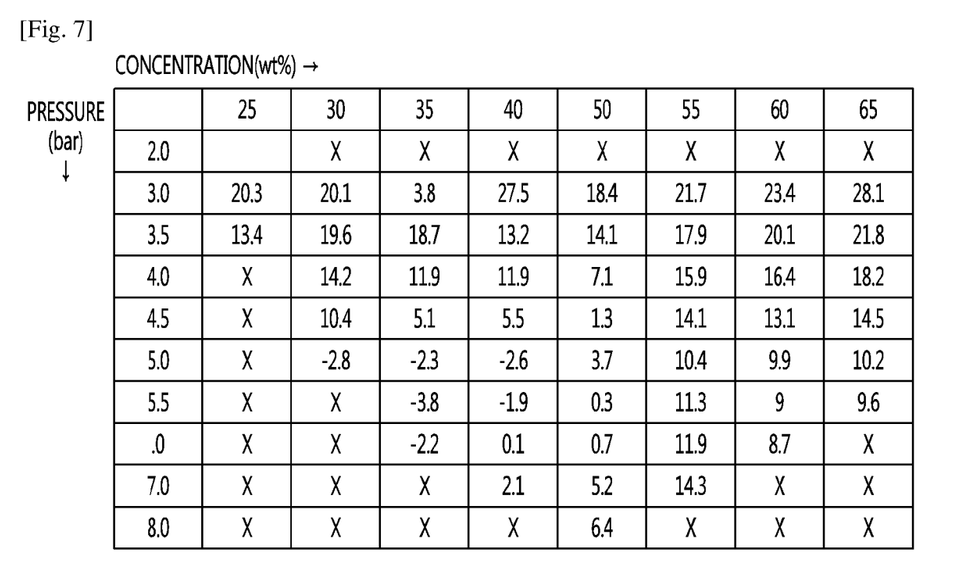
Figure 8:
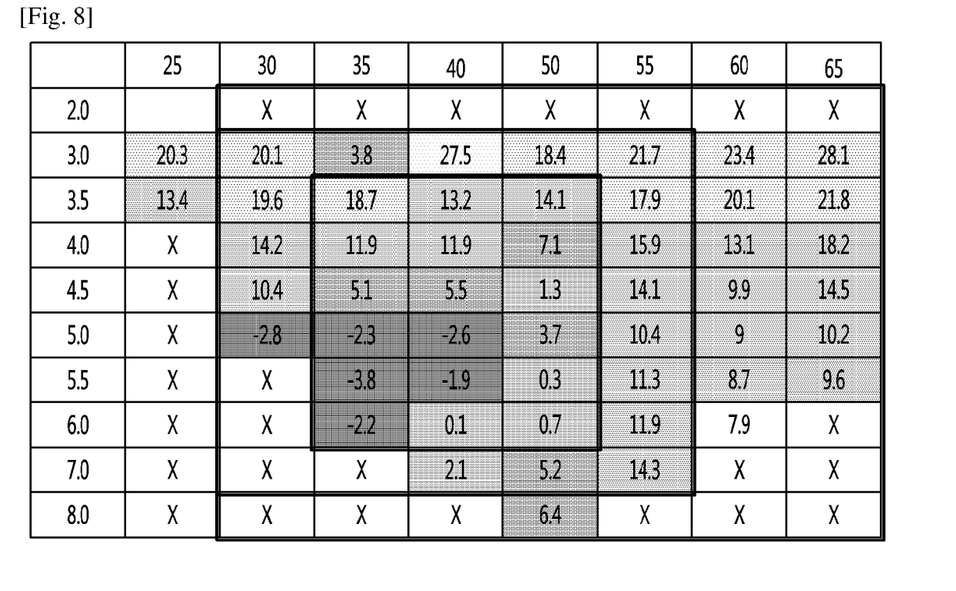

FIGS. 7 and 8 are tables which summarize the temperature of an evaporator by setting the atmospheric temperature at 28° C. and varying the pressure (vertical axis) of the auxiliary gas and the weight ratio (horizontal axis) of the refrigerant-absorbent based on an assumption that the atmosphere is summer, where FIG. 7 is a view illustrating measured values, and FIG. 8 is a view illustrating a region in which the temperature of the measured value is exhibited as a color and preferably suggested.

Figure 9:
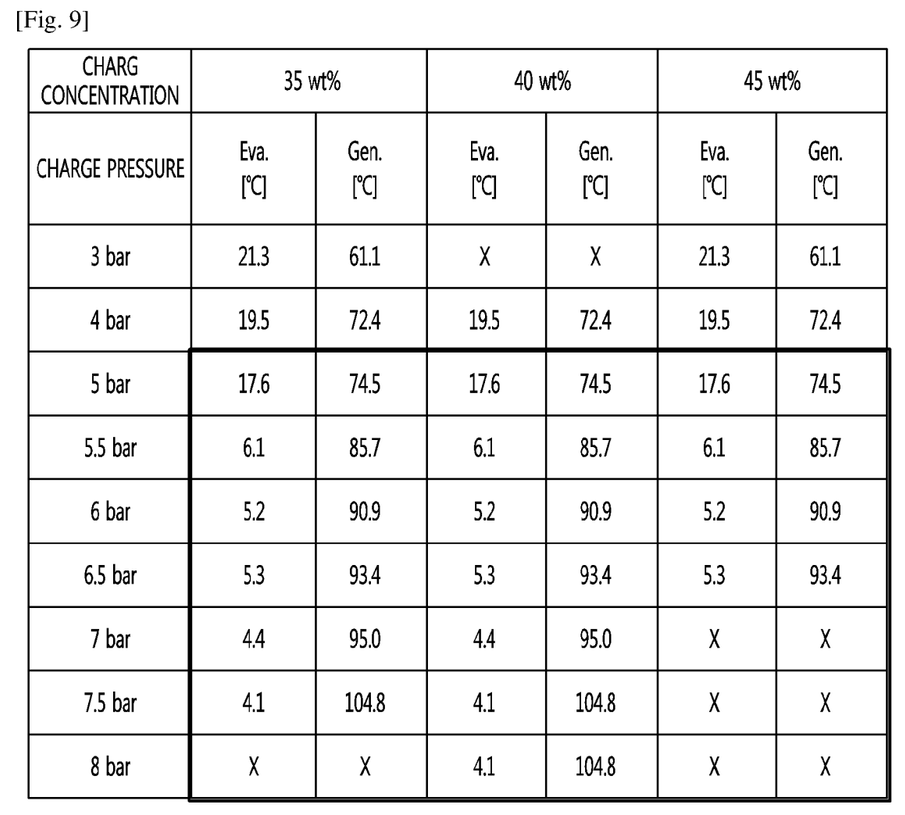
FIG. 9 is a view illustrating an evaporator and the temperature of the evaporator as a result of carrying out a plurality of experiments, while varying the pressure of an auxiliary gas and a weight ratio (a weight of a refrigerant/(a weight of a refrigerant+a weight of an absorbent) of the refrigerant-absorbent in a diffusion absorption refrigeration apparatus which uses 2,3,3,3-tetrafluoropropene, DMAC as the absorbent, and helium as the auxiliary gas.

FIG. 9 is a view illustrating an evaporator and the temperature of the evaporator as a result of carrying out a plurality of experiments, while varying the pressure of an auxiliary gas and a weight ratio (a weight of a refrigerant/(a weight of a refrigerant+a weight of an absorbent) of the refrigerant-absorbent in a diffusion absorption refrigeration apparatus which uses 2,3,3,3-tetrafluoropropene, DMAC as the absorbent, and helium as the auxiliary gas.

In FIGS. 5 to 9, the mark 'X' indicates that the cycle is not normally operated, and the mark '-' exhibits that the cycle is not carried out because an experiment need not be carried out due to the predictability.

Referring to FIGS. 5 to 9, it can be confirmed that in the diffusion absorption refrigeration apparatus, not only the weight ratio of the refrigerant-absorbent, but also the pressure of the auxiliary gas are essential for smooth driving of the cycle.

These matters will be specifically described.

When the weight ratio of the refrigerant-absorbent is low, the amount of refrigerant generated is decreased, so that the refrigeration system is not smoothly driven, and when the charge pressure of the auxiliary gas is low, the refrigerant is not smoothly circulated due to the decrease in condensed pressure, so that the freezing system is not normally driven.

As the weight ratio of the refrigerant-absorbent is decreased and the charge pressure of the auxiliary gas is increased, the temperature of the evaporator is decreased. When the weight ratio of the refrigerant-absorbent is low and the charge pressure of the auxiliary gas is low, the system is not smoothly driven.

Conversely, when the weight ratio of the refrigerant-absorbent is too high, the system is not smoothly driven even when the charge pressure of the auxiliary gas is too high. Further, when the charge pressure of the auxiliary gas is high, the temperature of the generator may be increased to affect the critical temperature of the refrigerant and cause damage to the device.

In view of the background described above, as illustrated in FIGS. 6 and 8, it is preferred that in the diffusion absorption refrigeration apparatus, the weight ratio of the refrigerant-absorbent is 30 wt % to 65%, and the charge pressure of the auxiliary gas is 2.0 bar to 8.0 bar.

Preferably, in the diffusion absorption refrigeration apparatus, it is preferred that the weight ratio of the refrigerant-absorbent is 30 wt % to 55 wt %, and a charge pressure of the auxiliary gas is 3.0 bar to 7.0 bar. In this case, the diffusion absorption refrigeration apparatus may be applied to a wine cellar which does not require a large refrigeration ability.

More preferably, in the diffusion absorption refrigeration apparatus, it is preferred that the weight ratio of the refrigerant-absorbent is 35 wt % to 50 wt %, and a charge pressure of the auxiliary gas is 3.5 bar to 6.0 bar. In this case, the diffusion absorption refrigeration apparatus may be applied to a general household refrigerator which requires a large refrigeration ability.

Meanwhile, as illustrated in FIG. 9, when 2,3,3,3-tetrafluoropropene is used alone as a refrigerant, in the diffusion absorption refrigeration apparatus, it is preferred that the weight ratio of the refrigerant-absorbent is 35 wt % to 45 wt %, and a charge pressure of the auxiliary gas is 5.0 bar to 8.0 bar.

Figure 10:
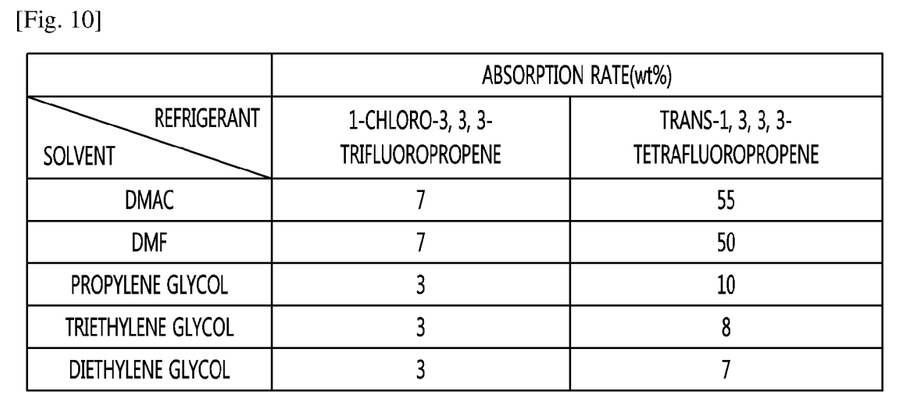
FIG. 10 is a view illustrating the absorption rate for each refrigerant and absorbent.

FIG. 10 is a view illustrating the absorption rate for each refrigerant and absorbent.

Referring to FIG. 10, as an example, when trans-1,3,3,3-tetrafluoropropene and 1-chloro-3,3,3-trifluoropropene are used as a refrigerant, and DMAC, DMF, propylene glycol, triethylene glycol, and diethyl glycol are used as an absorbent, the absorption rate is illustrated.

Figure 11:
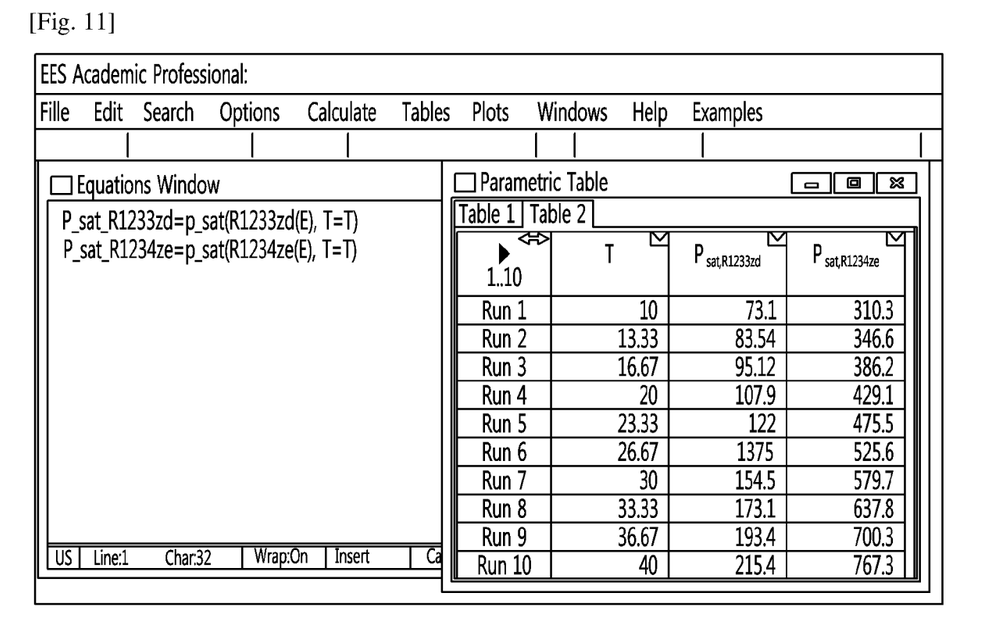
FIG. 11 is a view illustrating the saturated pressure for each refrigerant.

As illustrated in FIG. 10, in the case of 1-chloro-3,3,3-trifluoropropene (R1233zd), a low absorption rate is exhibited in all the organic solvents, which is supposed to result from the fact that the refrigerant has a low saturated pressure at room temperature, and as a result, the saturated absorption amount is low because the difference in partial pressure between the refrigerant and the solvent is not high, as suggested in FIG. 11.

For example, the saturated pressure of 1-chloro-3,3,3-trifluoropropene at 25° C. is 129.6 kPa, and the saturated pressure of trans-1,3,3,3-tetrafluoropropene at 25° C. is 500 kPa.

Meanwhile, it can be confirmed that a combination of a mixed solution obtained by using a trans-1,3,3,3-tetrafluoropropene refrigerant and an amide-based absorbent exhibits a refrigerant absorption amount of maximally 55 wt % or more, and glycol oil exhibits low absorption rate in both cases of trans-1,3,3,3-tetrafluoropropene and 1-chloro-3,3,3-trifluoropropene regardless of the type thereof, and cannot be used for the diffusion absorption refrigeration apparatus.

INDUSTRIAL APPLICABILITY

According to the present disclosure, a refrigerant having a low GWP is confirmed to have a potential for the diffusion absorption refrigeration apparatus, and can contribute to the expansion of the market for the diffusion absorption refrigeration apparatus.

The diffusion absorption refrigeration apparatus provided by the present disclosure may be particularly applied to an environment in which requires a low noise, thereby enhancing the customers' satisfaction and acceptance.

The invention claimed is:

1. A diffusion absorption refrigeration apparatus comprising:
a generator for generating refrigerant bubbles comprising a refrigerant gas;
a bubble pump for pushing a weak solution in which a refrigerant at low concentration with respect to an absorbent is dissolved in the absorbent using the refrigerant bubbles;
a gas-liquid separator for separating a liquid from the refrigerant gas;
a condenser for condensing the refrigerant gas;
a gas branch pipe for branching off an uncondensed refrigerant gas after passing through the condenser;
an evaporator for evaporating a condensed refrigerant in a liquid state condensed from the refrigerant gas through the condenser;
an absorber for regenerating the weak solution into a strong solution having a higher refrigerant amount than the weak solution using the evaporated refrigerant from the evaporator;
a gas heat exchanger for heat-exchanging the evaporated refrigerant from the evaporator with a refrigerant-auxiliary gas mixture that passed through the absorber;
a storage tank in which a liquid refrigerant and the auxiliary gas are stored; and
a solution heat exchanger for heat-exchanging the weak solution at high temperature and the strong solution at low temperature,
wherein the refrigerant is a single material of trans-1,3,3,3-tetrafluoropropene (R-1234ze(E)) and 2,3,3,3-tetrafluoropropene (R-1234yf), or a mixture thereof at a predetermined ratio, and
wherein the auxiliary gas is a single material of an inert gas comprising at least argon, or a mixture of an inert gas comprising at least argon at a predetermined ratio.

2. The diffusion absorption refrigeration apparatus according to claim 1, wherein the absorbent is a single material of an alkylacetamide and a formamide, or a mixture thereof at a predetermined ratio.

3. The diffusion absorption refrigeration apparatus according to claim 2, wherein the alkylacetamide uses a linear alkylacetamide.

4. The diffusion absorption refrigeration apparatus according to claim 2, wherein the alkylacetamide is dimethylacetamide (DMAC) and the formamide is dimethylformamide (DMF).

5. The diffusion absorption refrigeration apparatus according to claim 1, wherein a weight ratio of the refrigerant-absorbent, which exhibits a ratio of the refrigerant and the absorbent, is 30 wt % to 65 wt %, and a charge pressure of the auxiliary gas is 2.0 bar to 8.0 bar.

6. The diffusion absorption refrigeration apparatus according to claim 1, wherein a weight ratio of the refrigerant-absorbent is 30 wt % to 55 wt %, and a charge pressure of the auxiliary gas is 3.0 bar to 7.0 bar.

7. The diffusion absorption refrigeration apparatus according to claim 1, wherein a weight ratio of the refrigerant-absorbent is 35 wt % to 50 wt %, and a charge pressure of the auxiliary gas is 3.5 bar to 6.0 bar.

8. The diffusion absorption refrigeration apparatus according to claim 1, wherein when the 2,3,3,3-tetrafluoropropene is used alone, a weight ratio of the refrigerant-absorbent, which exhibits a ratio of the refrigerant and the absorbent, is 35 wt % to 45 wt %, and a charge pressure of the auxiliary gas is 5.0 bar to 8.0 bar.

9. A diffusion absorption refrigeration method, the method comprising:
condensing by a condenser, a refrigerant gas which is a single material of trans-1,3,3,3-tetrafluoropropene (R-1234ze(E)) and 2,3,3,3-tetrafluoropropene (R-1234yf), or a mixture thereof at a predetermined ratio;

transferring a liquid refrigerant discharged from the condenser to an inlet of an evaporator and transferring a refrigerant discharged from an absorber to the inlet of the evaporator, the refrigerant being mixed with an auxiliary gas, the refrigerant not passing through the evaporator before arriving at the inlet of the evaporator;

joining the liquid refrigerant and the refrigerant mixed with the auxiliary gas at the inlet of the evaporator;

carrying out cooling while the joined liquid refrigerant and the refrigerant mixed with the auxiliary gas is evaporated through the evaporator;

exchanging heat while the mixture of the evaporated refrigerant and the auxiliary gas passed the evaporator is passing through a gas heat exchanger, for the refrigerator discharged from the absorber to the inlet of the evaporator to be discharged as a refrigerant in liquid state mixed with the auxiliary gas;

joining the refrigerant in liquid state mixed with the auxiliary gas with an uncondensed refrigerant gas discharged from the condenser and transferring to a solution tank;

transferring a strong solution from the solution tank to a bubble pump; and dividing the strong solution into refrigerant bubbles comprising the refrigerant gas and a weak solution in which the refrigerant at low concentration with respect to an absorbent is dissolved in the absorbent, and guiding the refrigerant gas to the condenser.

10. The method according to claim 9, wherein the absorbent is a single material of an alkylacetamide and a formamide, or a mixture thereof at a predetermined ratio.

11. The method according to claim 10, wherein the alkyl acetamide is dimethylacetamide (DMAC) and the formamide is dimethylformamide (DMF).

12. The method according to claim 9, wherein the auxiliary gas is a single material of an inert gas comprising helium and argon, or a mixture thereof at a predetermined ratio.

13. The method according to claim 9, wherein a weight ratio of the refrigerant-absorbent, which exhibits a ratio of the refrigerant and the absorbent, is 30 wt % to 65 wt %, and a charge pressure of the auxiliary gas is 2.0 bar to 8.0 bar.

14. The method according to claim 9, wherein a weight ratio of the refrigerant-absorbent is 30 wt % to 55 wt %, and a charge pressure of the auxiliary gas is 3.0 bar to 7.0 bar.

15. The method according to claim 9, wherein a weight ratio of the refrigerant-absorbent is 35 wt % to 50 wt %, and a charge pressure of the auxiliary gas is 3.5 bar to 6.0 bar.

16. The method according to claim 9, wherein when the 2,3,3,3-tetrafluoropropene is used alone, a weight ratio of the refrigerant-absorbent, which exhibits a ratio of the refrigerant and the absorbent, is 35 wt % to 45 wt %, and a charge pressure of the auxiliary gas is 5.0 bar to 8.0 bar.

17. A diffusion absorption refrigeration apparatus comprising:

a bubble pump for pushing a weak solution in which a refrigerant at low concentration with respect to an absorbent is dissolved in the absorbent using refrigerant bubbles comprising a refrigerant gas by applying heat;

a gas-liquid separator for separating a liquid from the refrigerant gas;

a condenser for condensing the refrigerant gas;

a gas branch pipe for branching off an uncondensed refrigerant gas after passing through the condenser;

an evaporator for evaporating a condensed refrigerant that is condensed from the refrigerant gas through the condenser into a liquid state;

an absorber for regenerating the weak solution into a strong solution having a higher refrigerant amount than the weak solution using the evaporated refrigerant from the evaporator;

a gas heat exchanger for heat-exchanging the evaporated refrigerant from the evaporator with a refrigerant-auxiliary gas mixture that passed through the absorber; and a storage tank in which a liquid refrigerant and the auxiliary gas are stored and for supplying the liquid refrigerant to the bubble pump, wherein the refrigerant is a single material of trans-1,3,3,3-tetrafluoropropene (R-1234ze(E)) and 2,3,3,3-tetrafluoropropene (R-1234yf), or a mixture thereof at a predetermined ratio, the absorbent is a single material of an alkylacetamide and a formamide, or a mixture thereof at a predetermined ratio, wherein the evaporator has a single pipe without other concentrical pipes, and the auxiliary gas is a single material of an inert gas comprising helium and argon, or a mixture thereof at a predetermined ratio.

18. The diffusion absorption refrigeration apparatus according to claim 17, wherein a weight ratio of the refrigerant-absorbent is 35 wt % to 50 wt %, and a charge pressure of the auxiliary gas is 3.5 bar to 6.0 bar.

19. The diffusion absorption refrigeration apparatus according to claim 17, wherein when the 2,3,3,3-tetrafluoropropene is used alone, a weight ratio of the refrigerant-absorbent, which exhibits a ratio of the refrigerant and the absorbent, is 35 wt % to 45 wt %, and a charge pressure of the auxiliary gas is 5.0 bar to 8.0 bar.

* * * * *